United States Patent
Bartesch et al.

(10) Patent No.: US 6,705,667 B1
(45) Date of Patent: Mar. 16, 2004

(54) SUPPORTING STRUCTURE FOR A MOTOR VEHICLE

(75) Inventors: Hans-Georg Bartesch, Böblingen (DE); Karl-Heinz Baumann, Bondorf (DE); Ulrich Bruhnke, Ehningen (DE); Rainer Justen, Altdorf (DE); Jürgen Kohler, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/958,932

(22) PCT Filed: Mar. 14, 2000

(86) PCT No.: PCT/EP00/02246
§ 371 (c)(1),
(2), (4) Date: Jan. 14, 2002

(87) PCT Pub. No.: WO00/63061
PCT Pub. Date: Oct. 26, 2000

(30) Foreign Application Priority Data

Apr. 16, 1999 (DE) .......................................... 199 17 177

(51) Int. Cl.⁷ .............................................. B60R 27/00
(52) U.S. Cl. ........................... 296/187.01; 296/187.09; 296/191; 296/194; 296/203.02
(58) Field of Search .................. 296/187.01, 187.03, 296/187.09, 191, 193, 194, 195, 197, 203.01, 204, 205, 209, 900, 901, 203.02

(56) References Cited

U.S. PATENT DOCUMENTS

| | | | |
|---|---|---|---|
| 2,637,592 A | * 5/1953 | Karlby | 296/188 |
| 4,422,685 A | * 12/1983 | Bonfilio et al. | 296/197 |
| 4,428,599 A | * 1/1984 | Jahnle | 296/189 |
| 5,660,428 A | * 8/1997 | Catlin | 296/205 |
| 5,666,727 A | * 9/1997 | Rashid | 296/193 |
| 5,819,408 A | 10/1998 | Catlin | 29/897.2 |
| 5,881,458 A | * 3/1999 | Wolf et al. | 296/197 |
| 6,276,477 B1 | * 8/2001 | Ida | 296/197 |
| 6,286,896 B1 | * 9/2001 | Eipper et al. | 296/189 |

FOREIGN PATENT DOCUMENTS

| | | |
|---|---|---|
| DE | 19711273 A1 | 11/1997 |
| EP | 0255749 A1 | 2/1988 |
| GB | 2089464 A | 6/1982 |
| GB | 2114068 A | 8/1983 |
| WO | WO 94/06669 | 3/1994 |

* cited by examiner

Primary Examiner—D. Glenn Dayoan
Assistant Examiner—Lori L Coletta
(74) Attorney, Agent, or Firm—Crowell & Moring LLP

(57) ABSTRACT

A load-bearing structure for motor vehicles has a load-bearing floor of lightweight construction merging at its front in a footwell region into an upwardly projecting end wall. The structure also has a front-end structure which forms a crumple zone, is supported in the region of the end wall, and includes lightweight structural panels running in the longitudinal and transverse directions of the vehicle. The footwell region is bounded laterally and at the top by a panel arrangement of lightweight construction which, together with the floor and the end wall, forms a supporting box for the front-end structure.

40 Claims, 9 Drawing Sheets

SUPPORTING STRUCTURE FOR A MOTOR VEHICLE

The present invention relates to a load-bearing structure for motor vehicles.

BACKGROUND OF THE INVENTION

A load-bearing structure of this type for motor vehicles, which can be seen in European Patent Publication EP 0 255 749 B1, comprises a floor of sandwich construction which is of integral design with a front end wall. An approximately U-shaped front-end structure, which is likewise manufactured in a sandwich construction, is fastened in front of the end wall. Pillars which bear a roof construction can be fastened laterally to the floor. It is only by supplementing the floor with this roof construction that a sufficiently rigid safety passenger cell is produced. Therefore, in the event of a frontal impact of the motor vehicle, first of all the front-end structure is used for absorbing impact energy before damage occurs to the safety passenger cell. The known load-bearing structure is less suitable for motor vehicles having an open structure, such as roadsters or cabriolets.

A chassis for a motor vehicle can be seen in U.S. Pat. No. 5,819,408, which chassis is formed from a multiplicity of honeycomb layer elements, which are arranged one behind another and run in the transverse direction of the vehicle, in combination with framework supports. Each of the individual honeycomb layer elements comprises a basic metal plate from which a multiplicity of cup-like honeycombs are deep-drawn. In order to produce the chassis, the honeycomb layer elements, which are arranged in a row one behind another in the longitudinal direction of the vehicle, are fitted together and connected to one another by a welding process, after which the hollow spaces between the cup-like honeycombs are filled by a plastic. Subsequently, covering layers are bonded onto those narrow sides of the honeycomb layer elements which form the outsides of the chassis. All in all, this results in a chassis which is very complicated to produce and with individual wall sections which are produced only by fitting together and joining the individual honeycomb layer elements. Since the honeycomb layer elements represent the chassis cross section associated with them, they are of a correspondingly complex design. The fitted-together chassis comprises a hollow central body running in the longitudinal direction of the vehicle and a floor, which central body and floor extend in each case as far as the front end of the chassis. Accordingly, there is no division of the chassis into a safety passenger cell and a front-end structure which is arranged in front of the latter and is supported in the region of the end wall. Therefore, an accident-induced sequence of deformation, in which, first of all, the front-end structure collapses and only after that is the safety passenger cell deformed, is also not discernible or, in any case, is extremely difficult to realize.

SUMMARY OF THE INVENTION

One object of this invention is to provide a load-bearing structure for motor vehicles which is of sufficiently stable design even without a roof construction while maintaining a good performance in the event of a crash.

In a load-bearing structure according to the invention, improved supporting of the front-end structure against the floor of the load-bearing structure is provided by a supporting box, with the result that, in the event of a frontal crash, for example, a desired sequence of deformation is achieved.

The front-end structure acts in a particularly good manner as an energy-absorbing crumple zone, and the safety passenger cell together with the floor remains in its shape to a very large extent. The stable design of the load-bearing structure means that it can be used, in particular, for vehicles differing in structure. In addition, load-bearing tasks for components arranged in this region can be undertaken by the lightweight structural panels of the supporting box. For example, the upper lightweight structural panel of the supporting box can take on the function of a support below the dashboard and of the crossmember below the cowl.

In this case, an end wall extending approximately over the entire width of the floor can be manufactured cost-effectively because of the simple geometry and can be readily fastened to the side walls. If a transitional region of the end wall is directed obliquely upwards and forwards from the floor, then, in the event of a front impact, a sliding-off surface is provided both for the engine and for the front wheels and can be used to avoid excessive end-wall intrusions.

Two longitudinal members having an angled cross section make possible a rigid design of the front-end structure which is fastened particularly readily to the supporting box if the rear ends of the vertical panel limbs are supported over approximately the entire height. If the vertical panel limbs extend at least over half the height of the end wall, then overriding of the longitudinal members in the event of a frontal collision can be avoided in a reliable manner. A particularly simple longitudinal member which can be produced cost-effectively is provided if, in each case, one transversely running panel limb is connected to the associated, vertical panel limb at approximately a right angle. All in all, the shape and arrangement of the longitudinal members mean that they provide particularly good protection, for example in the event of a frontal impact where the overlap in terms of width between the vehicles involved is small.

By fastening a front module to the front end of the longitudinal members, a box-shaped formation stiffening the front-end structure is provided by the longitudinal members and the supporting box, particularly when the front module comprises a framework construction having an upper and lower crossmember.

If the rear partition is inclined obliquely upwards and rearwards, then, in the event of a rear impact, a sliding-off surface is provided for the rear wheels and, if appropriate, for a rear engine, and enables excessive wall intrusions to be avoided.

In a further refinement of the load-bearing structure, advantages corresponding to the front-end structure are also produced for the rear structure.

By fastening a rear wall to the rear end of the rear longitudinal members, a box-shaped formation is provided which stiffens the rear structure and is particularly reinforced by a panel arrangement made of lightweight structural panels.

If, in a further refinement of the invention, a tunnel fastened to the floor is provided between the end wall and the rear partition, then the floor is of particularly rigid design. In addition, forces occurring at the front-end structure or rear structure can be distributed particularly readily to the entire load-bearing structure.

By means of an inner door shell of lightweight construction, a stable door is produced which can easily be sealed with respect to the load-bearing structure by the largely parallel arrangement with respect to the side wall.

Lightweight structural panels can be manufactured very rapidly and, correspondingly, cost-effectively by extrusion of light metal alloys, for example aluminium. In this connection, it may be expedient, for the purpose of sound and heat insulation, to fill the hollow chambers of the lightweight structural panels with foam after they have been cut to length.

Since the load-bearing structure can be composed of essentially flat panels which are lightweight, but extremely stiff, no large-sized shapes are required in contrast to the conventional shell-type construction made of deep-drawn metal plates. Therefore, even vehicle series on a relatively small scale can be manufactured economically, since add-on parts for covering the load-bearing structure can be produced rapidly and cost-effectively, in particular from plastic. In this case, standardized load-bearing structures can be realized which are suitable without changes for different vehicle concepts.

By means of the holders which are fastened to the load-bearing structure and which can be used to fasten pillars of a roof construction, a very stiff connection of the load-bearing structure to the roof construction is obtained. In addition, the holders are used as supporting means for the door hinges.

Further advantages, features and details of the invention emerge from the following description of preferred exemplary embodiments and with reference to the drawings.

DESCRIPTION OF THE PREFERRED EMBODIMENTS

Figure 1A:
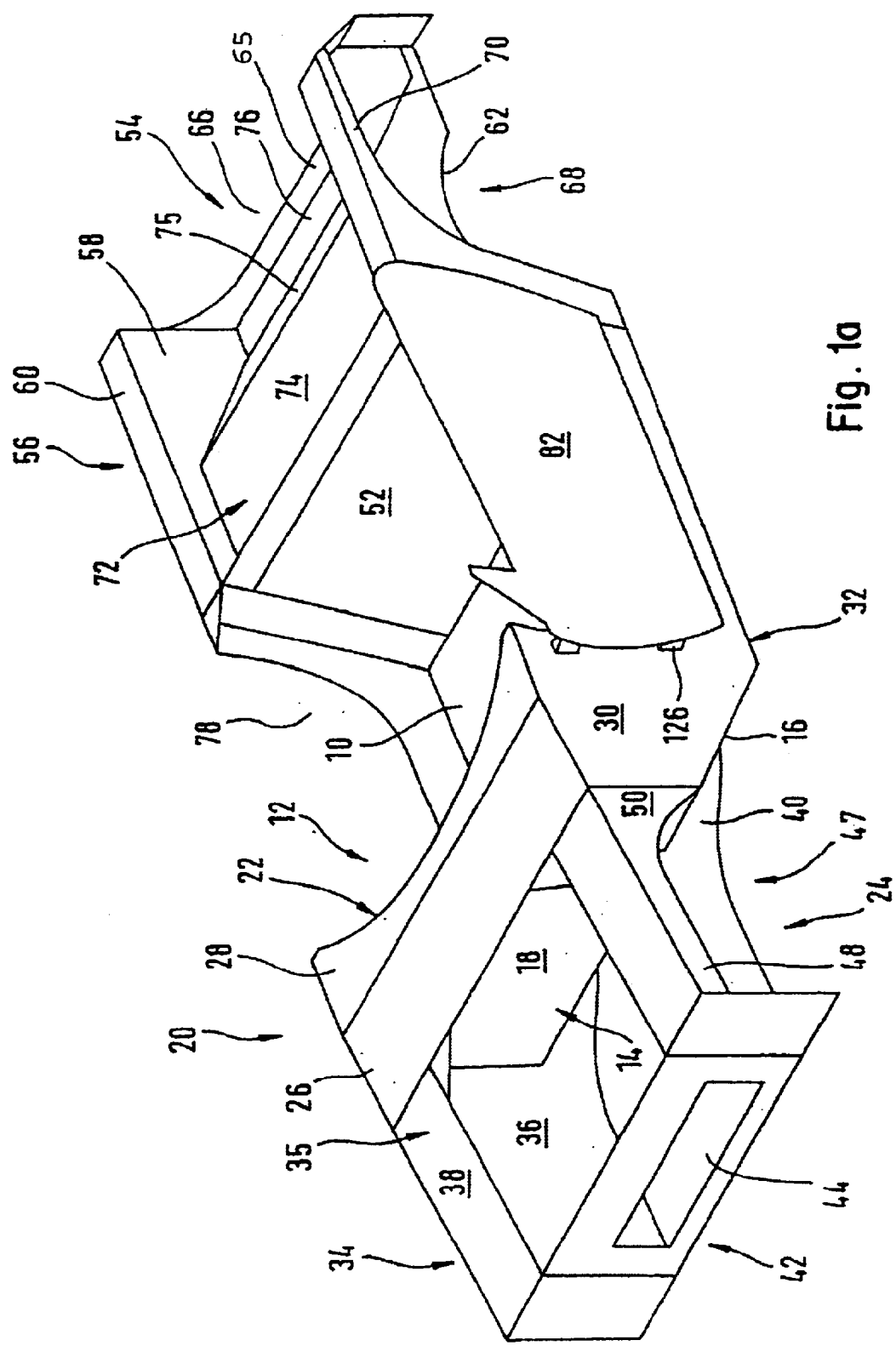
FIGS. 1a and 1b each show, in a perspective view obliquely from the front and from the side, a load-bearing structure of a motor vehicle according to a first embodiment of the invention.
Figure 1B:
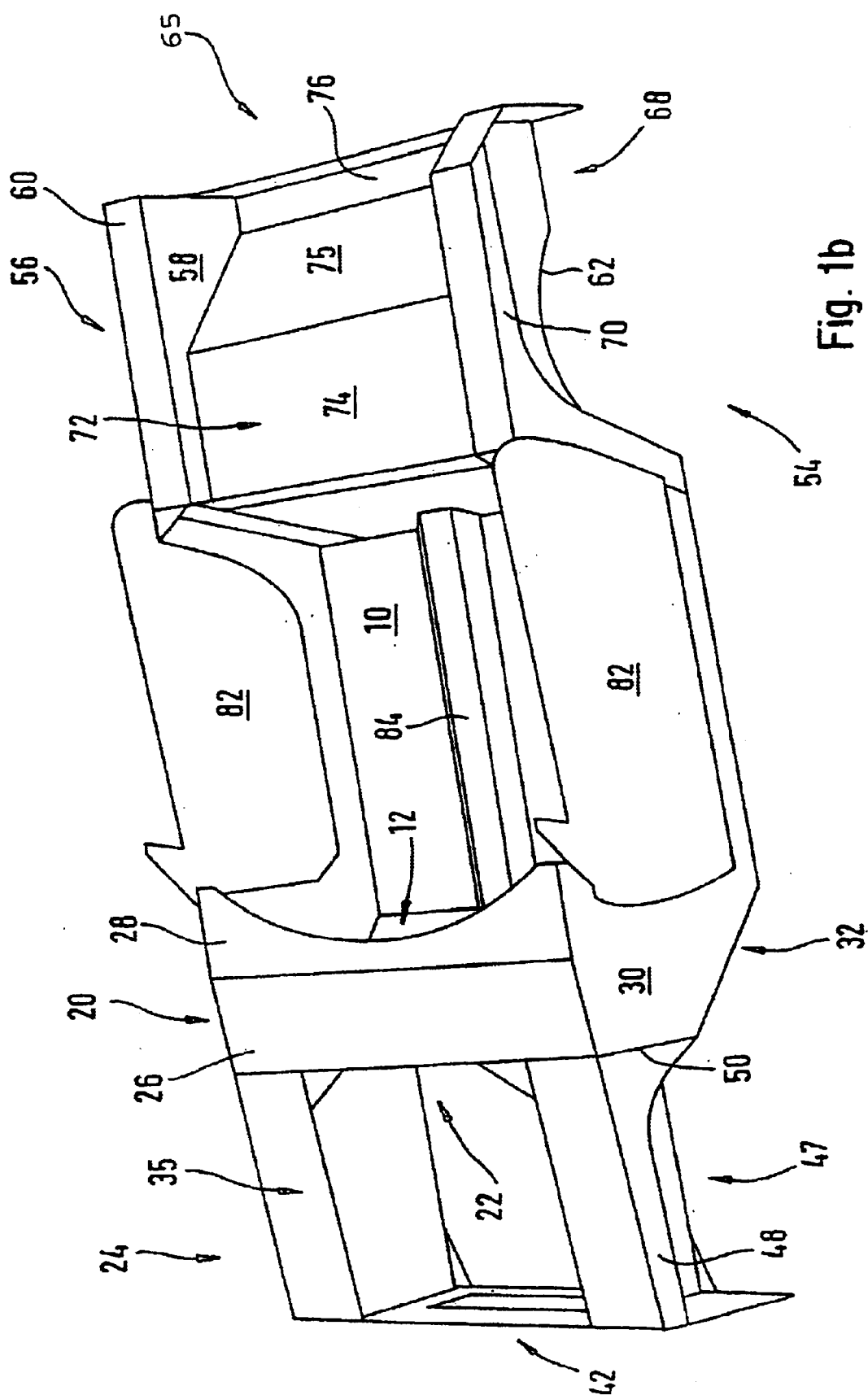

FIGS. 1a and 1b illustrate, in perspective views obliquely from the front and from the side, a load-bearing structure of a motor vehicle which contains a load-bearing floor 10 of lightweight construction. At the front in the footwell region 12, the floor 10 merges into an end wall 14 of lightweight construction which comprises a transitional region 16, which adjoins the floor and is directed obliquely upwards and forwards, and an approximately vertical region 18 arranged above the latter. The end wall 14 extends here over the entire width of the floor 10. The footwell region 12 is bounded laterally and at the top by a panel arrangement 20 of lightweight construction which, together with the floor 10 and the end wall 14, forms a supporting box 22 for a front-end structure 24. In this case, the panel arrangement 20 comprises a front and a rear, upper lightweight structural panel 26, 28 upwardly bounding the footwell region 12. The rear, upper lightweight structural panel 28 is arranged approximately horizontally and extends rearwards as far as a dashboard (not illustrated); the front, upper lightweight structural panel 26 is inclined somewhat downwards and forwards and extends forwards below a cowl (likewise not shown) as far as the vertical region 18 of the end wall 14. Furthermore, the panel arrangement 20 comprises lateral supporting-box walls 30 which bound the footwell region 12 laterally and in each case form a wall region of a side wall 32 of the load-bearing structure which will be explained in greater detail below. All in all, the front end wall 14, the floor 10, the two lateral supporting-box walls 30 and the two upper lightweight structural panels 26, 28 form the rigid supporting box 22 to which the front-end structure 24 is fastened. In this case, the floor 10, the transitional region 16 and the upper region 18 of the end wall 14 and the upper lightweight structural panels 26, 28 can consist either of an integral, appropriately angled panel or of a plurality of panels which are appropriately joined to one another. The lateral supporting-box walls 30, together with, for example, the end wall 14, the floor 10 or one of the upper lightweight structural panels 26, 28, can likewise be of integral design and be appropriately angled or can consist of separate components which are fastened to the assigned, lateral end of the supporting box 22.

As can be seen particularly in an overall view of FIG. 3, in which the load-bearing structure is illustrated in a perspective view from below, the front-end structure 24 is supported in the region of the end wall 14 against the supporting box 22. The front-end structure 24 comprises two front longitudinal members 34 of lightweight construction which each have an angled cross section with one approximately vertical panel limb 36 and one panel limb 38 running transversely thereto. In this case, the two panel limbs 36, 38 which are assigned to each other can be both of integral, angled design and of multi-part design and appropriately joined to one another. The vertical panel limbs 36 are arranged offset inwards, in the direction of the longitudinal central plane, with respect to the assigned, lateral supporting-box wall 30 and in a manner such that they run approximately parallel to said supporting-box wall, and extend here in the vertical direction of the vehicle over approximately two-thirds of the height of the end wall 14. In this case, the vertical panel limbs 36 have an approximately constant height over a large part of their longitudinal profile. In the region of their rear ends, the vertical panel limbs 36 are supported over approximately the entire height of the end wall 14 against the supporting box 22. In order to enable the front-end structure 24 to be supported against the supporting box 22 over as large an area as possible, the vertical panel limbs 36 are fastened both to the vertical, upper region 18 and to the lower transitional region 16. In order to fasten them to the transitional region 16, the vertical panel limbs 36 have wedge-shaped extensions 40 projecting obliquely downwards and to the rear. The panel limb 38, which in each case runs transversely, projects outwards laterally from the associated, vertical panel limb 36 at approximately a right angle and extends as far as the assigned side wall 32. The transversely running panel limbs 38 adjoin the front, upper lightweight structural panel 26 with their rear ends approximately level therewith. In this case, the two, upper lightweight structural panels 26, 28 and the transversely running panel limbs 38 can be both of multi-part design and joined to one another and formed from a single-piece, appropriately angled, lightweight structural panel. The upper side 35 and the transversely running panel limbs 38 of the front longitudinal members 34 are inclined downwards and forwards over their length, this inclination corresponding preferably to the inclination of the front, upper lightweight structural panel 26 of the supporting box 22.

Fastened to the front end of the longitudinal members 34 is a front module 42 which is designed here as a lightweight structural panel and runs in the transverse direction of the vehicle and approximately vertically. This lightweight structural panel 42 is matched in its height to that of the vertical panel limbs 36 and in its width to that of the supporting box 22. The lightweight structural panel 42 is provided with a passage opening 44 which makes possible the arrangement of a radiator, for example. Fastened to the lower side of the vertical panel limbs 36 and of the front module 42, in the region of their joining points 45, are triangular reinforcements 46 (FIG. 3) which serve, in particular, for bracing the angle of the joining points 45. The side walls 32 are extended forwards as far as the front module 42 and are provided with a respective wheel cutout 47. Accordingly, the side wall 32 is designed, over most of the length of the assigned longitudinal member 34, as a relatively narrow web 48 which is fastened to the transversely running panel limb 38 of the corresponding longitudinal member 34 at approximately a right angle, and to the front module 42. In this case, it would also be conceivable to design the narrow web 48 integrally with the transversely running panel limb 38. The narrow web 48 here is approximately one quarter the width of the vertical panel limb 36 of the longitudinal member 34. In front of the supporting box 22, the narrow web 48 widens, in a connection region 50, to the width of the front end of the lateral supporting-box walls 30. The narrow web 48 can be designed both as a single piece together with the associated side wall 32 and the lateral supporting-box wall 30 and also as a multi-part design joined together. Altogether, the vertical and the transversely running panel limbs 36, 38, the narrow web 48, the end wall 14 and the front lightweight structural panel 42 form a front wheel case of the load-bearing structure.

Figure 2:
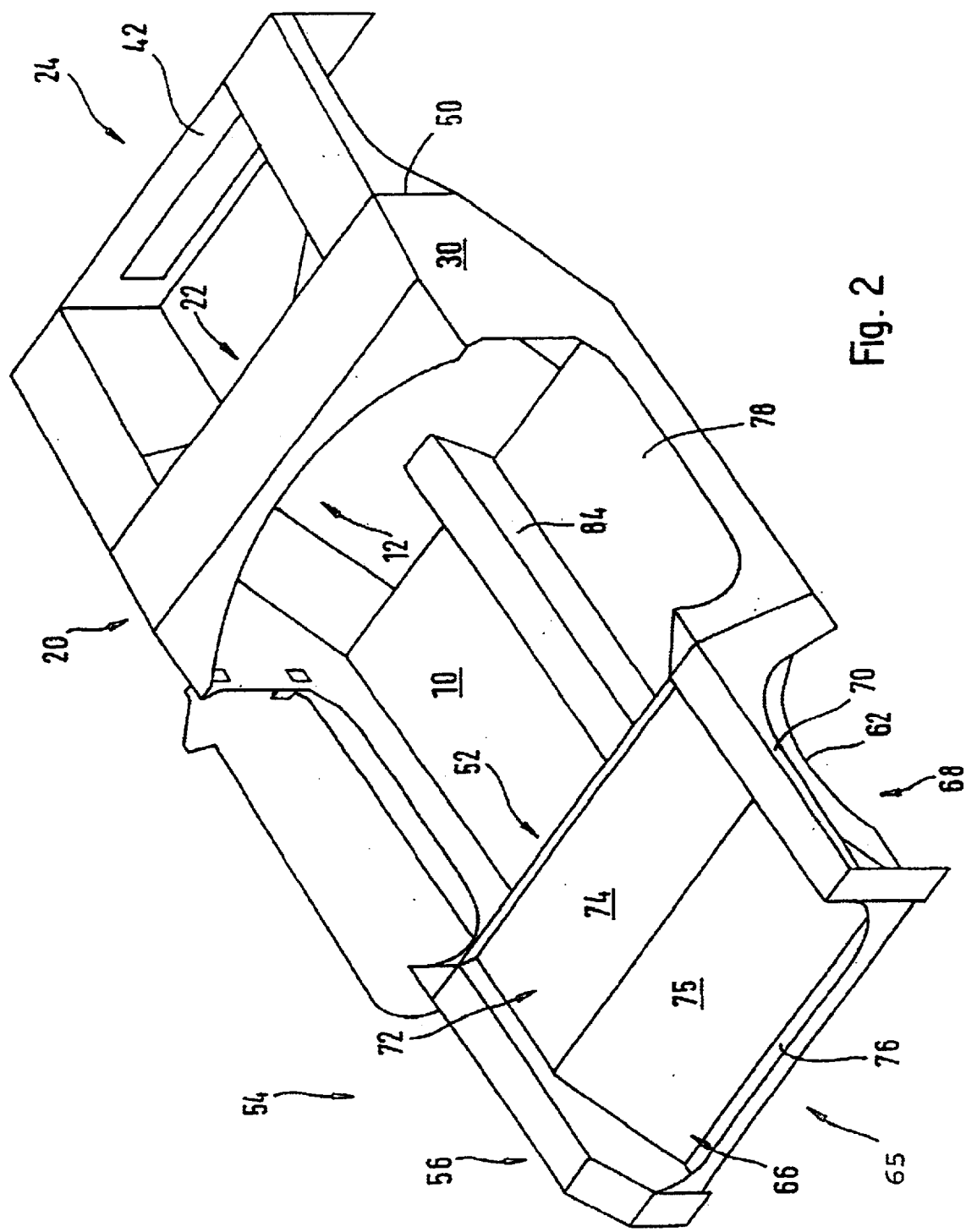
FIG. 2 shows, in a perspective view obliquely from the rear, the load-bearing structure according to the invention from FIGS. 1a and 1b.
Figure 3:
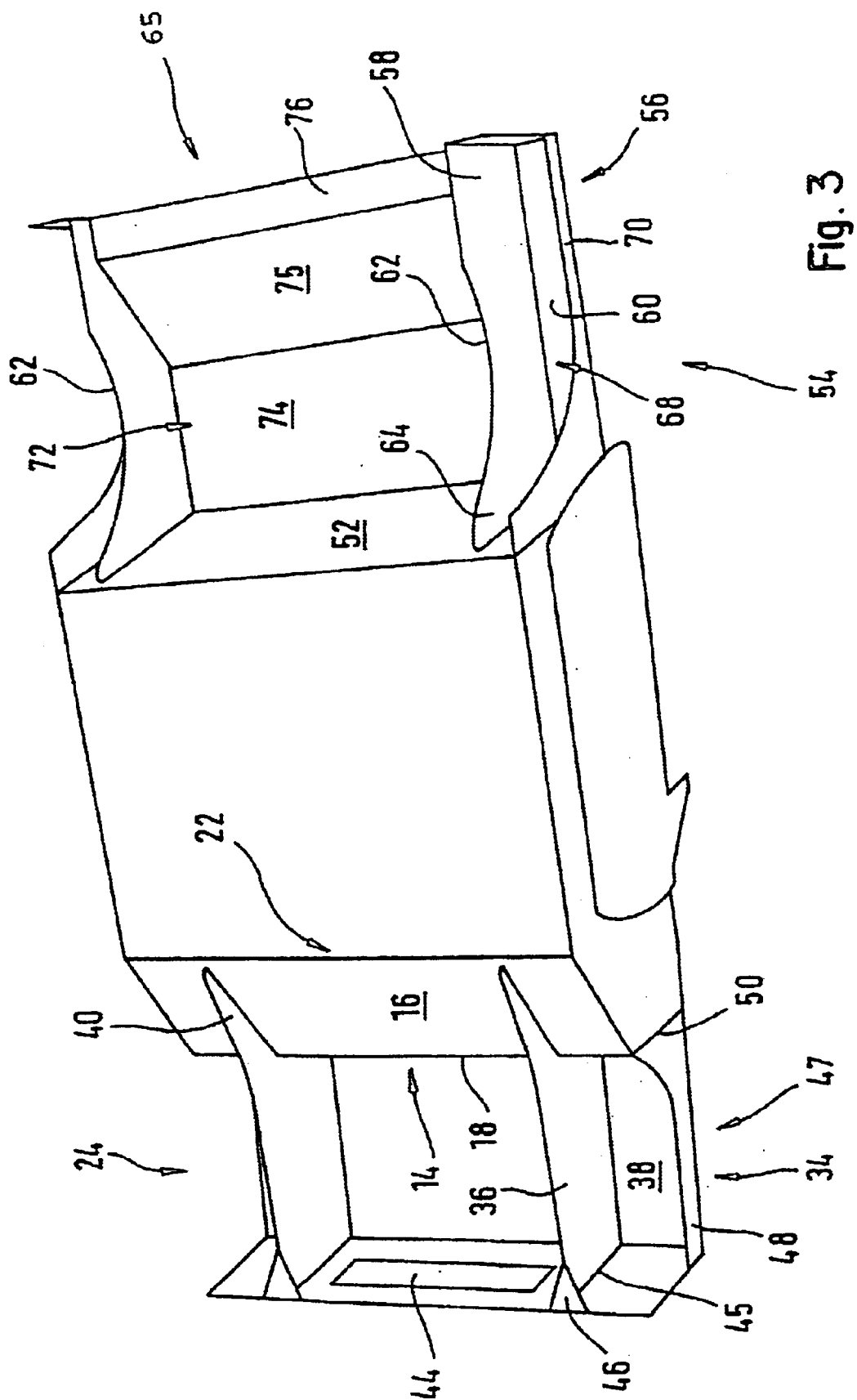
FIG. 3 shows a perspective view from below of the load-bearing structure from FIGS. 1a and 1b.

It can be seen, particularly in an overall view of FIGS. 2 and 3, that the floor 10 merges at the rear into a rear partition 52 which protrudes obliquely upwards and rearwards and is formed from a lightweight structural panel. In this case, the lightweight structural panel of the rear partition 52 can be formed both integrally with the floor 10 and angled with respect to the latter, and as a separate single-part or multi-part panel connected fixedly to the floor 10. The rear partition 52 extends between the side walls 32 approximately over the entire width of the floor 10.

Behind the rear partition 52, the load-bearing structure has a rear structure 54 having rear longitudinal members 56 made of lightweight structural panels which each have one panel limb 58 angled in the vertical direction of the vehicle and one panel limb 60 angled in the longitudinal direction of the vehicle. The two panel limbs 58, 60, which are assigned to each other, can be both of integral, angled design and of multi-part design and appropriately joined to one another. The vertical panel limbs 58 are arranged offset inwards, in the direction of the longitudinal central plane, with respect to the associated side wall 32 and such that they run approximately parallel thereto and extend here in the vertical direction of the vehicle over approximately two-thirds of the height of the rear partition 52. In this case, the vertical panel limbs 58 have an approximately constant height over a large part of their longitudinal profile. In the region of a rear axle (not shown), the vertical panel limbs 58 are provided with an inner wheel cutout 62. In order to enable the rear structure 54 to be supported against the rear partition 52 over as large an area as possible, the vertical panel limbs 58 have, at their respective, front ends, wedge-shaped extensions 64 which project obliquely downwards and forwards from the inner wheel cutouts 62 (FIG. 3). The transversely running panel limb 60 projects outwards laterally from the associated, vertical panel limb 58 at approximately a right angle and extends as far as the associated side wall 32. The transversely running panel limbs 60 adjoin the rear partition 52 with their front ends approximately level with the upper end thereof, and extend approximately horizontally in the longitudinal direction of the vehicle.

Fastened to the rear end of the rear longitudinal members 56 is a rear module 65 which is designed here as a rear wall of lightweight construction and runs in the transverse direction of the vehicle and approximately vertically. It is matched in its height to that of the vertical panel limbs 58 and in its width to the rear partition 52. A cutout 66 for a rear-wall door, designed here as a boot lid, is left open in the rear wall 65. The side walls 32 extend rearwards as far as the rear wall 65 and are provided with a respective wheel cutout 68. Accordingly, the side wall 32 is designed over most of the length of the assigned, rear longitudinal member 56 as a relatively narrow, rear web 70 which is fastened to the transversely running panel limb 60 of the corresponding longitudinal member 56 at approximately a right angle and to the rear wall 65. In this case, it would also be conceivable to design the narrow, rear web 70 integrally with the transversely running panel limb 60. The narrow web 70 can also be of integral design with the associated side wall 32 or can be of multi-part design and joined together therewith. The narrow, rear web 70 here is approximately one quarter the width of the vertical panel limb 58 of the rear longitudinal member 56. Altogether, the vertical and the transversely running panel limbs 58, 60, the narrow web 70, the rear partition 52 and the rear wall 65 form a rear wheel case of the load-bearing structure.

The vertical panel limbs 58 of the rear longitudinal members 56 are fixedly connected to one another to form a box via a panel arrangement 72 made of lightweight structural panels and comprising an approximately horizontal panel section 74 and a panel section 75 which is adjoined thereto and runs obliquely downwards and rearwards. A further, horizontally running, narrow panel section 76 is arranged between the obliquely running panel section 75 and the rear partition 52. The individual sections 74–76 and the rear partition 52 and the rear wall 65 can be manufactured both from one angled panel and from a plurality of panels which are joined together. The horizontal panel section 74, which adjoins the rear partition 52, runs at a distance below the transversely running panel limbs 60 of the rear longitudinal members 56, the rear partition 52 ending with its upper end either level with the horizontal panel section 74 or level with the transversely running panel limbs 60.

The side wall 32 has a door cutout 78 for a side door 80 (FIG. 4a), only an inner door shell 82 of which is illustrated in FIGS. 1a to 3. The inner door shell 82 which covers the door cutout 78 is arranged on the outside parallel to the side wall 32 and has a larger surface than the door cutout 78. As a result, an approximately U-shaped bearing surface is provided between the inside of the inner door shell 82 and the assigned side wall 32 with a seal (not illustrated) being arranged in the region of said bearing surface.

A tunnel 84, which can be seen in FIGS. 1*b* and 2, is arranged between the end wall 14 and the rear partition 52 and is fastened to the floor 10 and to the two walls 14, 52. The tunnel 84 comprises two panel sections of lightweight construction running in the vertical direction of the vehicle and one panel section of lightweight construction running approximately horizontally. The panel sections are of single-part or multi-part design. In this case, the end wall 14 and/or rear partition 52 can be cut out in the region of the tunnel 84 if the tunnel 84 is used as a propeller-shaft tunnel, for example.

Figure 4A:
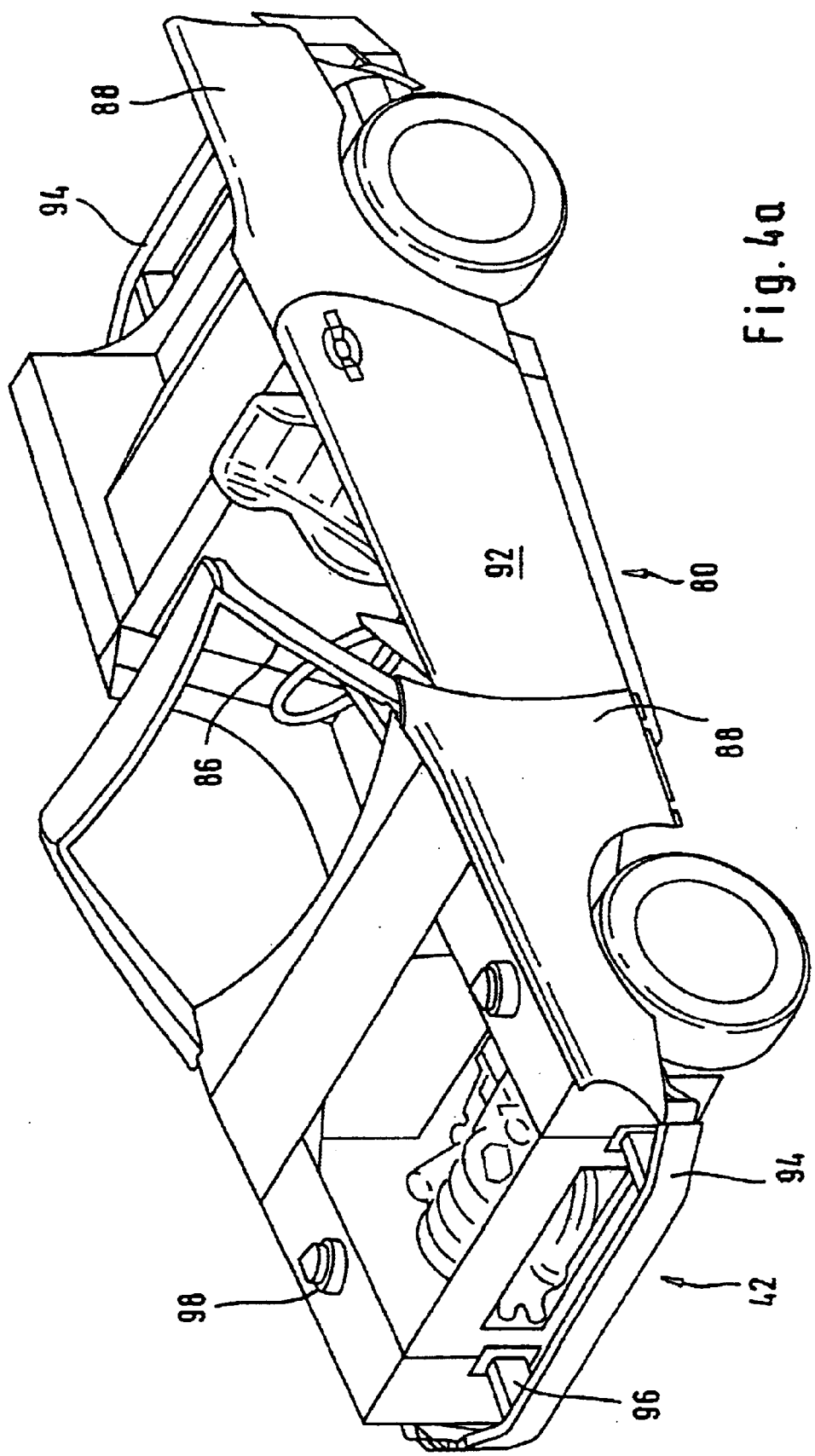
FIGS. 4a and 4b show a perspective view obliquely from the front and a sideview of the load-bearing structure from FIGS. 1a and 1b partially covered with panelling parts.
Figure 4B:
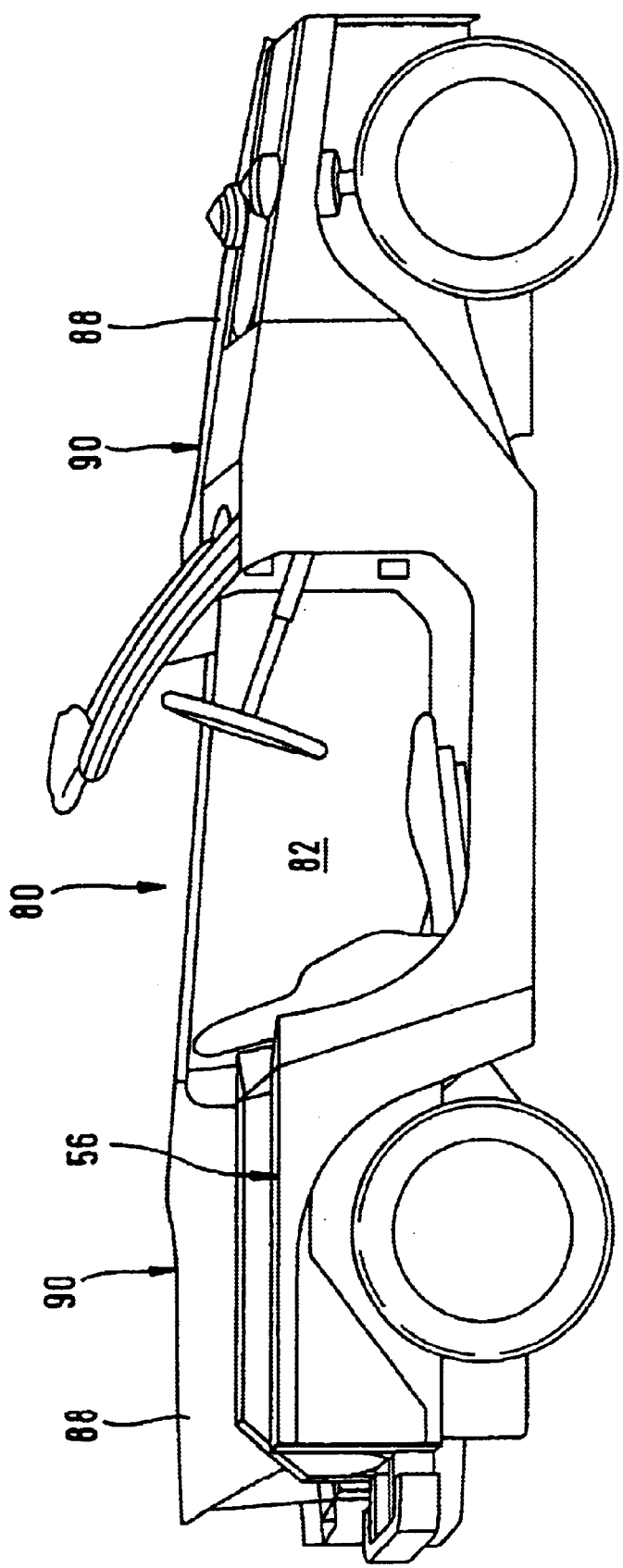

FIGS. 4*a* and 4*b* show, in a perspective view and in side view, a load-bearing structure which is partially covered and to which A-pillars 86 of a frame of the windscreen are fastened. In this case, the load-bearing structure is arranged in its entirety below the panelling. On the right-hand side of the load-bearing structure, panelling parts 88 forming the front and rear mudguards are fastened to corresponding holders of the load-bearing structure. In this connection, it can be seen, particularly in FIG. 4*b*, that the side wall 32 of the load-bearing structure ends below the assigned upper edge 90 of the boundary wall. Since the embodiment shown here of the load-bearing structure is designed for a roadster having a roof which can be retracted into the rear compartment, the upper side of the rear longitudinal members 56 and the panel arrangement 72 end at a relatively large distance below the upper edge 90 of the boundary wall and of an upper rear-compartment panelling (not illustrated).

The inner door shells 82 are lined with door panels 92 which are matched to the surrounding panelling parts 88, in particular of the assigned, front and rear mudguard here. The front module 42 shown in FIG. 4*a* additionally includes a lower crossmember 94 which is arranged in front of the lightweight structural panel and is fastened to the lightweight structural panel and to the longitudinal members 56 via two longitudinal limbs 96. In this case, crash boxes, which are used to absorb energy in the event of a frontal impact, can be integrated in the longitudinal limbs 96. A similar crossmember 94 is fastened to the rear end of the vehicle.

There can also be seen in FIGS. 4*a* and 4*b* shock-absorber domes 98 which protrude through the transversely running panel limbs 38 in the region of the front longitudinal members 34 and—preferably supported over a large area against the longitudinal members 34—provide holders for shock-absorbing elements.

Figure 5A:
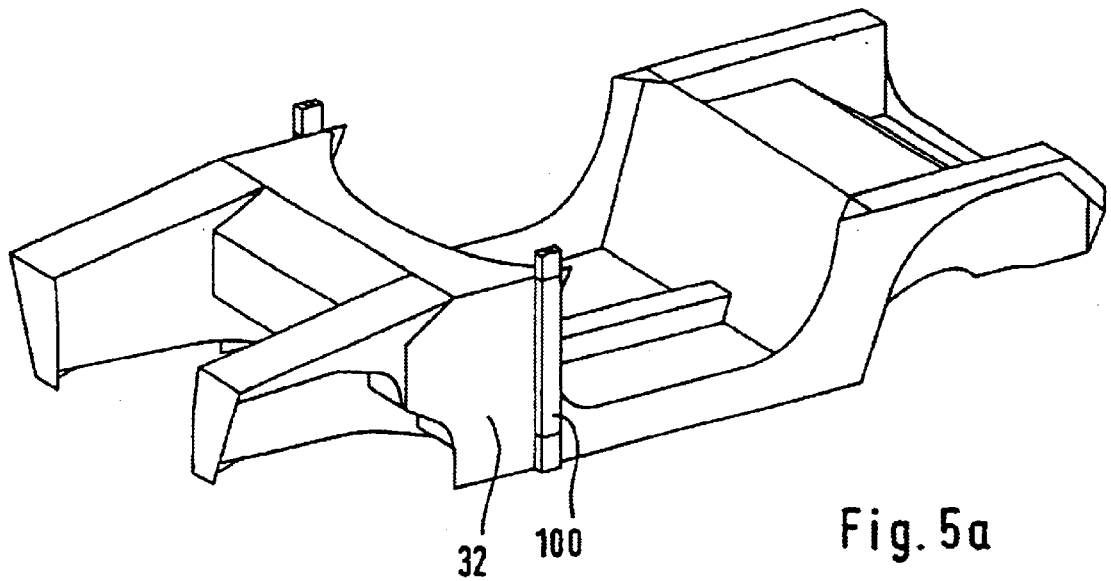
FIGS. 5a and 5b each show a perspective view obliquely from the front of the load-bearing structure from FIGS. 1a and 1b provided with lateral holders and a ramming-protection device.
Figure 5B:
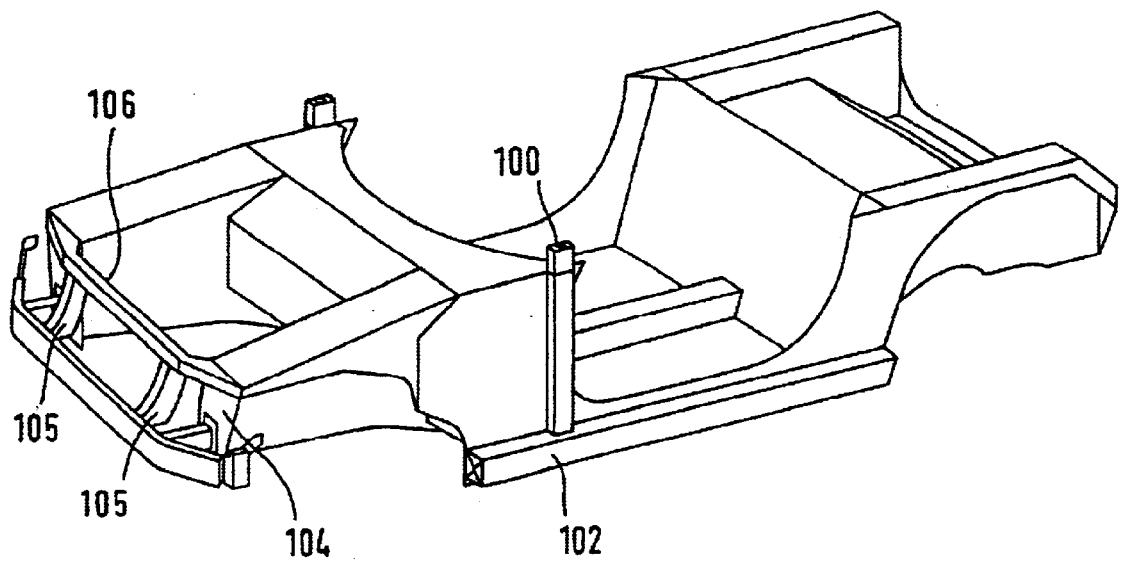

In FIG. 5*a*, a respective holder 100, which runs approximately vertically, has an approximately box-shaped cross section and into which the A-pillars 86 can be inserted and fixed, is fastened to the load-bearing structure on the outside of the lateral supporting-box walls 30. In this case, the holders 100 are preferably fastened over a large area to the load-bearing structure and extend over virtually the entire height of the side walls 32. The side doors 80 are coupled to the holders 100 preferably via to hinges 126 (FIG. 1*a*). As can be seen in FIG. 5*b*, a ramming-protection device 102, which extends in the longitudinal direction of the vehicle and covers the holder 100, is fastened in each case below the side door 80 and is preferably of approximately box-shaped design and, in particular, of sandwich construction, in the manner of a sill. The front module 42 here comprises two narrow, vertical panels 104 which are fastened to the respectively assigned, front longitudinal member 34 and are matched to the width of the longitudinal members 34. Approximately at the lower end of the panels 104, the crossmember 94, which has already been described with reference to FIG. 4*a*, is arranged fixedly via the longitudinal limbs 96. The crossmember 94 is part of a framework construction which has, at the upper end of the panels 104 next to the lower crossmember 94, a radiator bridge 106 which fixedly connects the longitudinal members 34, the crossmember 94 and the radiator bridge 106 being connected fixedly to each other via two vertical framework profiles 105.

Figure 6:
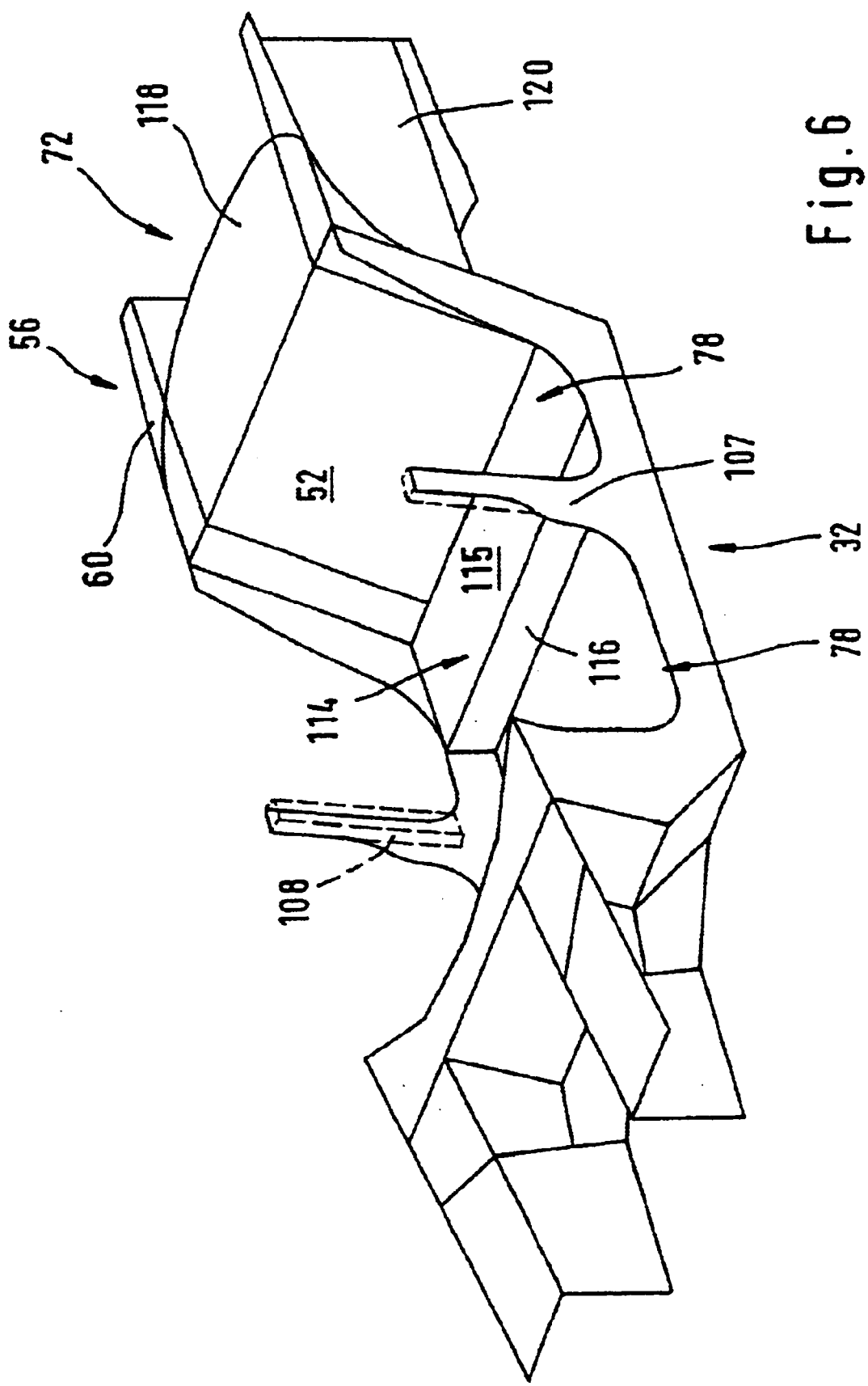
FIG. 6 shows, in a perspective view obliquely from the front, a load-bearing structure of a motor vehicle according to a second embodiment of the invention.

FIG. 6 shows, in a perspective view obliquely from the front, a load-bearing structure for a four-door sedan. In contrast to the load-bearing structure for the roadster, in each case two door cutouts 78 are provided in the side walls 32. A respective intermediate section 107 is provided between the adjacent door cutouts 78 and is intended for a holder 108 of a B-pillar 112 (FIG. 7) of the roof construction 110 (FIG. 7) which is of integral design with the side wall 32 and extends approximately until level with the end wall 32 and the rear partition 52. Of course, it would also be conceivable to produce the intermediate sections 107 from a separate panel and to connect them to the assigned side wall 32. The roof construction 110 acts in a strengthening manner on the load-bearing structure. In front of the rear partition 52, a further panel arrangement 114 of lightweight construction is provided, the panel sections 115, 116 of which form, together with the rear end of the floor 10 and the lower end of the rear partition 52, a box which is fastened on the end side to the respective side wall 32. The rear partition 52 ends here approximately level with the transversely running panel limbs 60 of the rear longitudinal members 56. The panel arrangement 72 between the rear longitudinal members 56 here comprises a panel 118 below the rear-window shelf and a boot floor 120 which extends below the rear-window shelf panel 118 parallel to it and at a distance from it between the rear partition 52 and the rear wall 65. In this connection, it would also be conceivable to provide the rear partition 52 with cutouts in order to provide a through-loading option between the boot 122 and interior. It would likewise be conceivable, for example in the case of an estate car, to omit the upper part of the rear partition 52 and the rear-window shelf panel 118 in order to provide an enlarged loading space. Secured to the side walls 32, in the region of the rear partition 52, are holders (not illustrated) for C-pillars (FIG. 7) of the roof construction 110 which holders can be designed in the manner of the holders 100, 108 for the A- or B-pillars 86, 112.

Figure 7:
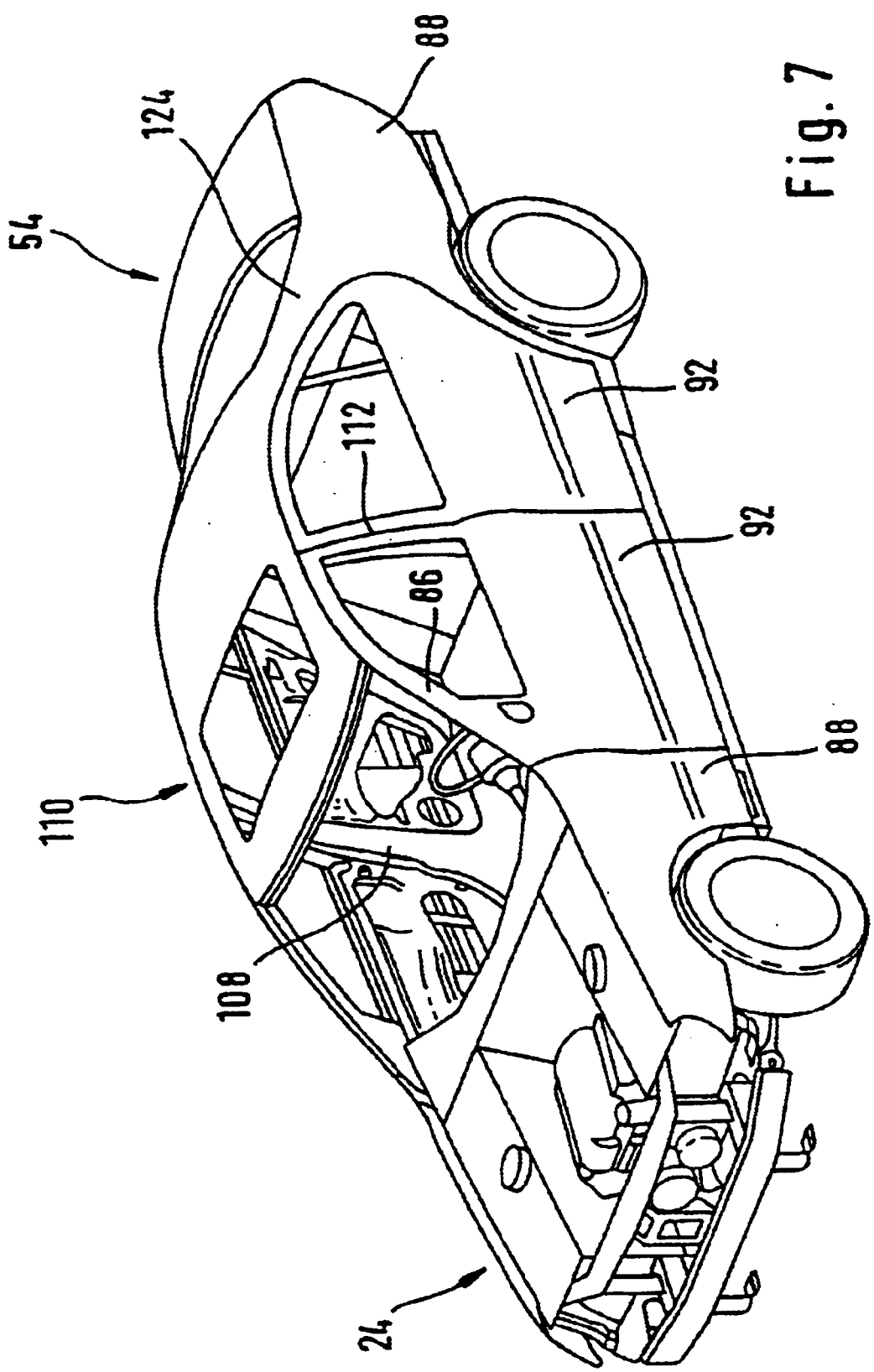
FIG. 7 shows a perspective view obliquely from the front and top of the load-bearing structure from FIG. 6 which is partially covered with panelling parts and to which a roof construction is fastened.

FIG. 7 shows the load-bearing structure from FIG. 6 which is partially covered with panelling parts 88, 92 and to which the roof construction 110 is fastened. The roof construction is fastened to the load-bearing structure via, inter alia, the pillars 86, 112, 124 and the assigned holders 100, 108. In this case, the vehicle roof, in particular, can likewise be formed from a lightweight structural panel.

At least the majority of the energy-absorbing and inherently stiff lightweight structural panels, which are preferably manufactured, depending on requirements, in a sandwich construction, with a honeycomb structure, in wood, in aluminium, as a fiber composite, as an extruded profile or the like, have a flat and simple design. In order to achieve favorable manufacturing conditions, the individual panel sections can be joined both integrally and in a multi-part manner. The individual panel sections are fixedly connected to one another in particular via welding, riveting, bonding, plug-in and screw connections or via connecting adapters. In particular, modules, for example of the front-end structure 24 or of the rear structure 54, can be manufactured from the lightweight structural panels and can subsequently be fixedly connected to one another.

In the event of a frontal accident, the load-bearing structure preferably has a sequence of deformation, in which, first of all, the front module 42 is deformed together with the crossmember 94 and the crash boxes 96. In the event of a relatively severe impact, the front-end structure 24 is acted upon together with the front longitudinal members 34, in which case the safety passenger cell retains its shape to a very great extent even in severe accidents. The sequence of deformation can be achieved, for example, by the use of different materials or different panel thicknesses. The front longitudinal members 34 can have a front section which can be replaced relatively simply in a crash involving repairs. The rear structure 54 is preferably also designed in accordance with the front-end structure 24.

Integral supports, axle bogies, assemblies or other chassis members can be supported, preferably over a large area, against the load-bearing structure via holders, shoes or the like.

What is claimed is:

1. A load-bearing structure for a motor vehicle comprising:
 a load-bearing floor of lightweight construction,
 an upwardly projecting flat end wall, said load-bearing floor merging at its front in a footwell region into said upwardly projecting flat end wall, and
 a front-end structure which forms a crumple zone, comprises lateral longitudinal members, is supported in a region of the flat end wall, and comprises lightweight structural panels running in vertical and transverse directions of the vehicle,
 wherein the footwell region is bounded laterally and at its top by a panel arrangement made of inherently stiff, flat lightweight structural panels, the lightweight structural panels, together with the floor and the end wall, forming a supporting box for the front-end structure.

2. The load-bearing structure according to claim 1, wherein the end wall extends approximately over the entire width of the floor.

3. The load-bearing structure according to claim 1, wherein the end wall comprises a transitional region which is directed obliquely forwards and upwards from the floor.

4. The load-bearing structure according to claim 1, wherein the front-end structure comprises two longitudinal members, each having an angled cross section.

5. The load-bearing structure according to claim 4, wherein the two longitudinal members are front longitudinal members, and wherein one approximately vertical panel limb of each of the front longitudinal members is arranged offset laterally inwards with respect to an associated, lateral supporting-box wall defined by one of the lightweight structural panels.

6. The load-bearing structure according to claim 5, wherein the vertical panel limbs of the front longitudinal members extend, at least in a region of their rear ends, at least over half the height of the end wall.

7. The load-bearing to structure according to claim 6, wherein the rear ends of the vertical panel limbs are supported over the approximately entire height of the end wall on the supporting box.

8. The load-bearing structure according to claim 5, wherein, in each case, one transversely running panel limb of the front longitudinal members projects outwards laterally from an associated vertical panel limb at approximately a right angle.

9. The load-bearing structure according to claim 8, wherein the transversely running panel limbs of the front longitudinal members adjoin the supporting box approximately level with an upper lightweight structural panel of the supporting box and extend as far as associated side walls of the supporting box, an upper side of each of the longitudinal members being inclined forwards and downwards over its length.

10. The load-bearing structure according to claim 4, and further comprising a front module fastened to front ends of the longitudinal members.

11. The load-bearing structure according to claim 10, wherein the front module is a lightweight structural panel.

12. The load-bearing structure according to claim 10, wherein the front module comprises a framework construction having an upper crossmember and a lower crossmember, the upper crossmember being arranged approximately level with upper edges of the front ends of the longitudinal members, and the lower crossmember being arranged in lower regions of the ends of the longitudinal members.

13. The load-bearing structure according to claim 4, wherein the panel arrangement upwardly bounding the footwell region extends from the end wall of the supporting box as far as the dashboard, at least one front, upper lightweight structural panel of the panel arrangement and the transversely running panel limbs of the longitudinal members consisting of a lightweight structural panel.

14. The load-bearing structure according to claim 1, wherein the lightweight structural panels define lateral supporting-box walls, and wherein each of the lateral supporting-box walls forms a wall region of a side wall of the supporting box, the side wall extending at least from the end wall as far as a rear end of the floor.

15. The load-bearing structure according to claim 4, wherein the side wall ends at a distance below an upper edge of a boundary wall.

16. The load-bearing structure according to claim 4, wherein the side wall consists of a lightweight structural panel and has at least one door cutout.

17. The load-bearing structure according to claim 4, wherein the side wall is extended forwards as far as a front module and is provided with a wheel cutout.

18. The load-bearing structure according to claims 4, wherein the floor merges at its rear into an upwardly projecting rear partition which is produced from a lightweight structural panel.

19. The load-bearing structure according to claim 18, wherein the rear partition extends approximately over the entire width of the floor.

20. The load-bearing structure according to claim 18, wherein the rear partition is inclined obliquely upwards and rearwards.

21. The load-bearing structure according to claim 18, and further comprising a rear structure having rear longitudinal members made of lightweight structural panels which each have one panel limb angled in the vertical direction of the vehicle and one panel limb angled in the transverse direction of the vehicle.

22. The load-bearing structure according to claim 21, wherein each vertical panel limb of the rear longitudinal members is arranged offset inwards with respect to an assigned side wall.

23. The load-bearing structure according to claim 21, wherein each vertical panel limb of the rear longitudinal members extends, at least in a region of its front end, at least over half the height of the rear partition.

24. The load-bearing structure according to claim 21, wherein front ends of the vertical panel limbs are supported over approximately the entire height of the rear partition on the rear partition.

25. The load-bearing structure according to claim 21, wherein the panel limbs of the rear longitudinal members project outwards laterally from the associated, vertical panel limb at approximately a right angle.

26. The load-bearing structure according to claim 22, wherein the side walls extend over the entire length of the rear structure and are provided with wheel cutouts.

27. The load-bearing structure according to claim 1, wherein the rear longitudinal members are fixedly connected at their rear ends to a rear wall which runs in the transverse direction of the vehicle and from which a cutout for a rear-wall door is left free.

28. The load-bearing structure according to claim 1, wherein the vertical panel limbs of the rear longitudinal members are connected to one another via a panel arrangement made of lightweight structural panels to form a box.

29. The load-bearing structure according to claim 28, wherein the panel arrangement comprises an approximately horizontal panel section and, adjoining thereto, a rear panel section of lightweight construction which is inclined obliquely downwards and rearwards.

30. The load-bearing structure according to claim 8, wherein a tunnel fastened to the floor, is provided between the end wall and the rear partition.

31. The load-bearing structure according to claim 6, wherein the door cutout is assigned a side door in which at least an inner door shell is designed as a lightweight structural panel largely parallel to the side wall.

32. The load-bearing structure according to claim 1, wherein at least most of the lightweight structural panels are designed as flat panels.

33. The load-bearing structure according to claim 1, wherein at least the floor of the load-bearing structure is manufactured from a single-piece extruded profile or from a plurality of extruded profiles put together.

34. The load-bearing structure according to claim 1, and further comprising paneling parts provided for covering the load-bearing structure of the vehicle.

35. The load-bearing structure according to claim 34, wherein doors of the vehicle are equipped with door panels which are matched to the panelling parts surrounding the doors.

36. The load-bearing structure according to claim 35, and further comprising holders provided on the side walls, in a region of the supporting box, which can be used to fasten A-pillars of a roof construction to the load-bearing structure.

37. The load-bearing structure according to claim 36, and further comprising further holders provided on the load-bearing structure which can be used to fasten further pillars of a roof construction to the load-bearing structure.

38. The load-bearing structure according to claim 37, wherein the holders are fastened over a large area to the load-bearing structure and extend virtually over the entire height of the side walls.

39. The load-bearing structure according to claim 36, wherein the doors are coupled to the holders.

40. The load-bearing structure according to claim 6, and further comprising a ramming-protection device below the at least one door cutout.

* * * * *